United States Patent
Shimizu et al.

(10) Patent No.: US 9,657,185 B2
(45) Date of Patent: *May 23, 2017

(54) BRILLIANT BLACK PIGMENTS

(75) Inventors: Kaiman Shimizu, Roth (DE); Fumiko Sasaki, Iwaki (JP); Yukitaka Watanabe, Iwaki (JP)

(73) Assignee: Merck Patent GmbH, Darmstadt (DE)

( * ) Notice: Subject to any disclaimer, the term of this patent is extended or adjusted under 35 U.S.C. 154(b) by 57 days.

This patent is subject to a terminal disclaimer.

(21) Appl. No.: 13/991,638

(22) PCT Filed: Nov. 14, 2011

(86) PCT No.: PCT/EP2011/005730
§ 371 (c)(1),
(2), (4) Date: Jun. 5, 2013

(87) PCT Pub. No.: WO2012/076110
PCT Pub. Date: Jun. 14, 2012

(65) Prior Publication Data
US 2013/0251771 A1  Sep. 26, 2013

(30) Foreign Application Priority Data

Dec. 9, 2010 (EP) .................................... 10015471

(51) Int. Cl.
| C09D 7/12 | (2006.01) |
| C09C 1/00 | (2006.01) |
| C09D 5/36 | (2006.01) |
| A61Q 1/10 | (2006.01) |
| C09D 11/037 | (2014.01) |

(52) U.S. Cl.
CPC ............. *C09D 7/1291* (2013.01); *A61Q 1/10* (2013.01); *C09C 1/0015* (2013.01); *C09D 5/36* (2013.01); *C09D 7/1225* (2013.01); *C09D 11/037* (2013.01); *C01P 2004/54* (2013.01); *C01P 2006/42* (2013.01); *C09C 2200/1004* (2013.01); *C09C 2200/30* (2013.01); *C09C 2200/302* (2013.01); *C09C 2200/305* (2013.01); *C09C 2200/401* (2013.01); *C09C 2220/106* (2013.01)

(58) Field of Classification Search
CPC combination set(s) only.
See application file for complete search history.

(56) References Cited

U.S. PATENT DOCUMENTS

| 3,926,659 | A | 12/1975 | Bernhard et al. |
| 4,867,793 | A | 9/1989 | Franz et al. |
| 5,702,519 | A | 12/1997 | Nitta et al. |
| 6,302,952 | B1 | 10/2001 | Mobbs et al. |
| 7,303,622 | B2 | 12/2007 | Loch et al. |
| 8,114,211 | B2 | 2/2012 | Handrosch et al. |
| 8,211,225 | B2 | 7/2012 | Hollman et al. |
| 2003/0005859 | A1* | 1/2003 | Andes et al. ................. 106/403 |
| 2003/0175435 | A1* | 9/2003 | Harakawa ............ C08F 265/04 427/385.5 |
| 2004/0038355 | A1 | 2/2004 | Vogt et al. |
| 2006/0070552 | A1 | 4/2006 | Loch et al. |
| 2009/0162696 | A1* | 6/2009 | Kitamura ............... B05D 5/068 428/701 |
| 2009/0169589 | A1* | 7/2009 | Schmidt et al. ............. 424/401 |
| 2009/0255442 | A1 | 10/2009 | Hollman et al. |
| 2010/0021565 | A1 | 1/2010 | Handrosch et al. |
| 2012/0261606 | A1 | 10/2012 | Hollman et al. |

FOREIGN PATENT DOCUMENTS

| DE | 3617430 A1 | 11/1987 |
| DE | 10065761 A1 | 7/2002 |
| EP | 0763573 A2 | 3/1997 |
| GB | 2333518 A | 7/1999 |

OTHER PUBLICATIONS

International Search Report from PCT/EP2011/005730 dated Feb. 3, 2012.

* cited by examiner

*Primary Examiner* — David J Blanchard
*Assistant Examiner* — Robert Cabral
(74) *Attorney, Agent, or Firm* — Millen, White, Zelano & Branigan, P.C.

(57) ABSTRACT

The present invention is related to brilliant black pigments comprising a flaky aluminum oxide substrate having a coating comprising a layered structure composed of a hematite and a magnetite layer, to a process for the production of said pigments, as well as to their use.

24 Claims, No Drawings

BRILLIANT BLACK PIGMENTS

The present invention relates to brilliant black pigments comprising a transparent flaky aluminum oxide substrate and a coating comprising a layered structure which consists of a hematite layer and a magnetite layer, and, optionally, a further colourless dielectric layer thereon, to a process for the production of said pigments as well as to their use.

The brilliant black pigments of the present invention are particularly useful for decorative, cosmetic and automotive applications, where deep black colouristics exhibiting high lustre and, optionally, almost not exhibiting any interference colours despite the high lustre, are strongly desired for valuable designs of pure black. Of course, they may also be used in other fields where either their colouristic properties, also in admixture with coloured pigments of any kind, or their magnetic properties which they additionally exhibit, might be of interest, in particular in printing inks.

Besides coloured pigments with attractive colours, black pigments exhibiting a deep black absorption colour as well as high lustre have been desired for a long time. Traditionally, carbon black pigments have been used to a great extent in automotive applications, printing applications as well as in cosmetic applications, or the like.

Unfortunately, carbon black absorption pigments do not exhibit any lustre and have to be admixed with lustreous pigments in order to get a lustreous black coloured appearance of the corresponding product, whereby the black colour is diminished. In addition, meanwhile the use of carbon black pigments in cosmetics has been limited to a great extent since there might be a health risk for the potential user.

Therefore, there have been attempts to replace non-lustreous carbon black pigments by lustreous black pigments not containing carbon black.

U.S. Pat. No. 3,926,659 discloses mica pigments which are optionally coated with $TiO_2$ or $ZrO_2$ or hydrates thereof, having a uniform iron containing layer thereon, which may be of alpha iron oxide (hematite, $Fe_2O_3$) or of magnetite ($Fe_3O_4$). The colouristic properties of these pigments are mostly due to the interference colour produced by the $TiO_2$ or $ZrO_2$ layer, which is slightly shifted by the application of an alpha iron oxide layer thereon. Their body colour is, depending on the layer thickness of the alpha iron oxide layer, a warm reddish brown hue. In case a magnetite layer is produced on top of the $TiO_2$ or $ZrO_2$ layer, the interference colour produced by the underlying layer is reinforced by a thin black magnetite layer or superimposed by a thick magnetite layer. Pigments having a thick magnetite layer lose their lustre, because the magnetite layer is said to be rough due to the crystalline configuration thereof.

Pigments of this type do not fulfil the requirements of exhibiting a strong black absorption colour combined with a good hiding power as well as an attractive lustre.

In DE 100 65 761 A1 flaky magnetic particles are described, which are multilayered and contain a core comprising $Al_2O_3$ or a mixed phase of $Al_2O_2$ and $SiO_2$, an intermediate layer of amorphous $SiO_2$ and a shell containing iron, the latter may, inter alia, contain magnetite or hematite. These particles are coated with inorganic or organic coupling agents being able to react with nucleic acids or proteins for isolation thereof in aqueous solutions. Since these pigments are made from aluminum powders by suspension in water and adding water soluble silicatic compounds, the cores thereof are not of homogeneous composition, but of mixed oxides of aluminum and silicon instead, optionally with remainings of aluminum metal. In addition, since the core material decomposes at least partly, the platy shape of the particles and a smooth surface thereof may not be maintained in the resulting pigment. Furthermore, the control of the production process is difficult, since the reaction of aluminum powder in water is highly exothermic per se and since the following reaction with iron compounds is dangerous as well (thermite process). The colouristic properties of these pigments are not described and do not play any role for the intended purpose.

In DE 3617430, platy coloured pigments are described, which are composed of a platy substrate of mica, glass, metal or graphite, especially of mica, which may be pre-coated with a metal oxide layer and comprise a compact Fe(II) containing layer either directly on the substrate or on the metal oxide layer. An additional covering layer is also possible. The Fe(II) containing layer may be of $Fe_3O_4$ and is described to be dense and compact, which is due to the particular method for the production of these pigments. The resulting pigments exhibit a black body colour in combination with coloured interference colours.

U.S. Pat. No. 7,303,622 discloses lustreous black interference pigments based on a substrate mixture of fine and rough substrate particles, which have a coating of $Fe_3O_4$, a colourless low refractive coating thereon, as well as optionally an absorbent, high refractive index material thereon which only covers part of the surface, as well as optionally a further layer which is a protective layer. As a preferred substrate, mica of different particle size ranges (fractions obtained by classification of the pigments) is used. The resulting pigment mixture is said to exhibit a black body colour as well as high lustre.

The pigment mixture is furthermore said not to produce a pronounced goniochromaticity (angle dependent interference colour).

Although the pigments according to the latter two prior art documents exhibit a somewhat lustreous black appearance, there is still a need for deep black pigments exhibiting a still higher lustre than the pigments of the prior art, which might, at will, not possess any harming interference colours or colour flops at all and which may be produced by an economic process which is easy controllable and does not involve reduction steps or high temperatures.

Thus, the aim of the present invention is to provide pigments which fulfil the aforementioned requirements, do not possess the detrimental effects of the pigments described in the prior art and may be produced in a simple wet coating process without involving any reduction steps, to provide an economic process for the production of these pigments, as well as their use.

The object of the present invention is achieved by brilliant black pigments comprising flaky aluminum oxide substrate particles exhibiting an aspect ratio of at least 85, and a coating comprising a layered structure consisting of a first layer composed of hematite and/or goethite and of a second layer composed of magnetite, in this sequence, on the substrate.

In addition, the object of the present invention is achieved by a process for the production of such brilliant black pigments, comprising the following steps:
  (a) dispersing flaky aluminum oxide substrate particles exhibiting an aspect ratio of at least 85, optionally being coated with at least one dielectric coating, in water,
  (b) adding a water soluble iron (III) compound at a pH of between 2 and 4 and keeping the pH value constant, thereby precipitating a layer composed of hematite and/or goethite onto the surface of the substrate particles, (c) raising the pH to a value of from 5.5 to 7.5 and adding a water soluble iron (II) compound and a water soluble iron (III) compound, and optionally also adding an aqueous solution of an aluminum compound, while keeping the pH value constant, thereby directly precipitating a magnetite layer, which is optionally doped with an aluminum compound, onto the surface of the substrate particles precoated in step (b), (d) optionally washing and filtering the resulting product, and (e) drying at a temperature in the range of from >100° C. to <180° C.

Furthermore, the object of the present invention is also achieved by the use of said pigments for pigmenting inks, paints, varnishes, coating compositions, plastics, foils, paper, ceramics, glasses, cosmetic and pharmaceutic formulations, for laser marking and for pigmenting pigment preparations of diverse solvent contents.

The first object of the invention is achieved by providing brilliant black pigments comprising flaky aluminum oxide substrate particles exhibiting an aspect ratio of at least 85, and a coating comprising a layered structure consisting of a first layer being composed of hematite and/or goethite and a second layer being composed of magnetite, in this sequence, on the substrate.

A flaky aluminum oxide substrate in the sense of the invention is a particulate substrate having an upper surface and a lower surface which do, both, constitute the major surfaces of the particulate substrate and are lying parallel to each other. These substrate particles are transparent and of homogeneous composition.

Parallel in the sense of the invention does not merely mean strictly parallel in a geometrical sense, but also substantially parallel in a sense that the major surfaces are smooth and planar and in that the angle of deviation in comparison to geometrically parallel surfaces is not larger than 15°. The extension of the major surfaces in length and width constitutes the largest dimension (particle size) of the flaky particles.

The length difference between the major surfaces constitutes the thickness of the flaky substrates. In general, the thickness of the flaky substrates of the present invention is much smaller than the particle size thereof. According to the present invention, the aspect ratio, which is the ratio between particle size and thickness, of the substrate particles is at least 85 and preferably ≥100, but may also be up to 200. This applies at least to the ratio between mean particle size and mean thickness of the substrate particles as such, but preferably to the actual ratio between particle size and thickness of each single substrate particle.

The particle size (particle diameter) of the pigments may be measured by different methods, e.g. by a laser diffraction method using a commercially available instrument, for example a Malvern Mastersizer 2000, APA200, product of Malvern Instruments Ltd. UK. The advantage of this method is that, besides the actual particle size, also the particle size distribution within a pigment fraction or pigment mixture may be measured by the standard procedure (SOP). For determining the particle size as well as the thickness of a single pigment particle, SEM (scanning electron microscope) images may advantageously be used, where the thickness and the particle size of each particle may be directly measured.

Transparent in the sense of the present invention are flaky substrates if they substantially transmit visible light, i.e. to at least 90% of the incoming visible radiation.

The substrates of the brilliant black pigments according to the present invention are homogeneous in their composition, i.e. they are composed of the same material, either of a single compound or a mixture of compounds or a mixed oxide, at each location in the substrate. In particular, there is no gradient or particular zones of different materials within a single substrate particle.

Flaky substrate particles exhibiting absolutely smooth and planar surfaces and being homogeneous in their composition are usually not available by using common natural substrate particles such a mica, talc or other phyllosilicates. The latter materials are composed of several layers which are layered one on top of each other in such a way that the outer surfaces of the material are not planar and smooth, but exhibiting steps inside the layer package.

Therefore, the substrate particles used in the present invention are synthetically produced substrate materials, composed of aluminum oxides such as $Al_2O_3$ or of $Al_2O_3$ containing up to 5% by weight $TiO_2$, based on the weight of the substrate, both referred to as aluminum dioxide flakes in the following. They are preferably present in a the form of monocrystals. These pigments may be produced by exactly controlling the thickness of the particles as well as the smoothness of the outer surfaces, and, in addition, also by controlling the thickness variation of the particles and deviation of the particle sizes in the end, the latter being highly important for the production of the brilliant black pigments according to the present invention.

The aluminum dioxide flakes employed for the pigments of the present invention have a mean thickness between 50 and 250 nm, preferably between 100 and 200 nm and most preferred between 130 and 170 nm. The thickness deviation of the substrate particles is preferably not larger than 10% and may be controlled by the production process of the corresponding substrate particles.

The mean diameter of the substrate particles, which corresponds to the largest dimension of the substrate, i.e. the particle size, is, according to the present invention, smaller than 20 µm, usually between 5 and 19 µm, in particular smaller than 16 µm, especially between 5 and 15 µm. $D_{50}$ values of from 10 to 15 µm are preferred. A narrow particle size distribution is in particular of advantage. The particle size distribution may be controlled by the process parameters as well as by an optionally executed milling and/or classification process.

The ratio (aspect ratio) between substrate particle diameter (particle size) and thickness of the substrate particles is crucial for the optical characteristics of the pigments according to the present invention. It is known in the art, that the thickness of an interference layer of an interference pigment determines the interference colour as well as the hiding power, in case that there is some absorption besides interference. On the other side, particle sizes of interference pigments are known to have a strong impact on the lustre of the pigments.

Whereas large pigments with smooth surfaces exhibit strong lustre, but may be observed as single pigments which might be disadvantageous, small particle sizes lead usually to a weak lustre, but are not observable as single particles in the corresponding coating.

Since the aluminum dioxide flakes used for the pigments according to the present invention are of aluminum dioxide or of aluminum dioxide having a small content of $TiO_2$, they exhibit a substantially higher refractive index than usually used pigment substrates such as mica, glass, etc. In addition, they exhibit extremely smooth and uniform surfaces. Therefore, a lower substrate thickness is sufficient in order to allow a useful interference behaviour which, in combination with the following layers, leads to the desired optical characteristics of the pigments. In addition, as described above, the particle size of the pigments must hold the balance between lustre and visibility of single particles. Therefore, it has been revealed now that the desired brilliant black appearance of the resulting pigments might be achieved if the aspect ratio for the aluminum dioxide flakes used in the present invention is at least 85 as described above. This may be achieved even by using relatively small particle sizes, which would not be visible as single particles in corresponding coatings. Nevertheless, due to the highly reflective substrate surface and due to the high reflection of the interference layers applied thereon, a high lustre of the resulting black pigments may be achieved, also combined with a highly desired good hiding power.

The coating comprising a layered structure which consists of a first layer being composed of hematite and/or goethite and a second layer being composed of magnetite, the latter on top of the former, may be a coating merely on the two major surfaces of the substrate, but does, preferably, encapsulate the transparent substrate in such a way that all of the outer surfaces of the transparent flaky substrate are coated with the hematite/goethite-magnetite-layered structure. It goes without saying that the hematite/goethite-magnetite-layered structure does not have to exhibit the same thickness at each single point of the substrate surface and that even there may be some smaller surface areas of the substrate which are not perfectly coated with the layered structure or, at least with the hematite/goethite layer mentioned above. Limitations of this kind are due to technical production aspects and do not harm the intention of the present invention.

For the purpose of the present invention, the layer composed of hematite and/or goethite is called "hematite layer" thereafter. The actual composition thereof is dependent on the precipitation conditions used for the preparation thereof. For the conditions given in the process according to the present invention, the composition of the hematite layer has been revealed being preferably either of pure hematite (alpha $Fe_2O_3$, ferric oxide) or of hematite containing goethite (alpha FeO(OH), hydrated ferric oxide). Usually, the content of goethite is smaller than the content of hematite.

The layer composed of magnetite is called "magnetite layer" thereafter and is, in the case it is produced by the process according to the present invention, composed of pure either pure magnetite ($Fe_3O_4$) or of magnetite containing very small amounts of maghemite (gamma $Fe_2O_3$).

For the optical characteristics of the pigments of the present invention it is very important that the thickness of the magnetite layer within the layered structure is larger than the thickness of the hematite layer. In fact, the thickness of the magnetite layer is much higher than the thickness of the hematite layer. Typically, the thickness of the magnetite layer within the layered structure is at least 10 fold the thickness of the hematite layer.

The hematite layer is coated onto the (optionally precoated) substrate particles with a very small layer thickness only, starting from a molecular monolayer and having an upper limit of about 5 nm. Usually, the thickness of the hematite layer is in the range of from 0.1 to 3.5 nm, preferably of from 0.1 to 2.5 nm. According to the present invention, the hematite layer may act as a binder for the magnetite layer which is to be coated on top of the hematite layer underneath.

Furthermore, in particular with respect to the aluminum dioxide flakes used as substrate particles according to the present invention, or with respect to the possible precoatings they bear, the usually obtained outer surfaces of these particles are often not particularly useful for directly being coated with iron oxides at a rather lower acidic to neutral pH value as used for the direct coating of $Fe_3O_4$ according to the present invention.

Therefore, the thin hematite layer, which may in addition also act as a means for activating the surface of the substrate particles, is coated directly onto the substrate or onto the pre-coated substrate, since it might be directly precipitated with good success onto the aluminum dioxide flakes or the dielectric layers which act as precoatings and provides an activated surface itself, which is of advantage for the precipitation of the following magnetite layer. Furthermore, the very smooth and planar surface of the substrate particles may be maintained by precipitating a dense and uniform, but ultra thin hematite layer.

In addition, since the underlying substrate contains $Al_2O_3$ crystals or is composed of these, the following hematite layer is able to form crystals in the same crystal structure as present in the underlying substrate, namely in the corundum crystal structure, which is of advantage for the formation of a dense hematite layer. In such a case, the growth of the hematite layer on the substrate which contains $Al_2O_3$ crystals or is substantially composed of these is similar to an epitaxial crystal growth process of a crystalline layer onto a solid substrate. Still furthermore, the presence of the hematite layer is also advantageously useful for forming a dense, planar and substantially crystalline layer of $Fe_3O_4$ directly thereon by a precipitation procedure not using an oxidizing agent.

From the prior art it was known that $Fe_3O_4$ layers could be formed in a reduction process with a hematite layer as the starting material. Following this reduction process, unevenness of the resulting layer should be expected, since non-regular reduction throughout the layer thickness of the former hematite layer (gradient) might occur. Furthermore, when using prior art precipitation methods, small crystallites of $Fe_3O_4$ and a rather loose crystal structure of the layer, which result if $Fe_3O_4$ is precipitated using Fe(II) compounds in the presence of an oxidizing agent at rather high (8 to 11) pH values, lead to non-lustreous pigments in the end.

To the contrary, the pigments according to the present invention exhibit a strong lustre as well as a brilliant black appearance, which is substantially due to the interference and absorption behaviour of the substrate as well as of the magnetite layer. In addition, it has been revealed, that the only useful interference colour of the layer package, which does not detrimentally harm the brilliant black appearance of the pigments according to the present invention, is a weak blue interference, since the colour impression of a bluish deep black is still the impression of a valuable black colour. Therefore, merely a weak blue interference colour of the present pigments in addition to a deep black absorption colour is allowed.

Thus, not merely the layer thickness of the substrate particles has to be adjusted as described above, but also the layer thickness of the magnetite layer (the hematite layer is so thin that it does, per itself, not contribute to the interference of the pigment, but merely in combination with the other layers and the substrate, respectively).

Therefore, the magnetite layer of the layered structure of the pigments according to the present invention is present in a thickness of from at least 50 nm to about 250 nm, in particular of from 80 nm to 180 nm. It is adjusted in such a way that a weak bluish interference colour of the resulting pigment is achieved (may be controlled by known means in the precipitation process for the magnetite layer).

The magnetite layer exhibits a dense and crystalline structure. The smoothness of the substrate particles may be maintained, so that the magnetite layer as such is also smooth, dense and planar. It exhibits a high refractive index of higher than 2.0 (about 2.4). Besides the weak bluish interference colour, the magnetite layer does also impart, via its absorption, a black body colour and an intense lustre to the resulting pigments.

In addition, it is preferred that the magnetite layer is doped with at least one aluminum compound, which is preferably an aluminum oxide and/or an aluminum oxide hydrate. The doping is accomplished by adding an appropriate aluminum compound while the magnetite layer is precipitated onto the substrate particles pre-coated with hematite. Useful aluminum compounds are e.g. aluminum sulphates, aluminum chlorides or aluminum nitrates.

The Al-doping of the magnetite layer contributes to the optical behaviour of the magnetite layer and facilitates the precipitation of the following layer onto the magnetite layer, if present.

The aluminum oxide and/or aluminum oxide hydrate, as mentioned above, is present in the magnetite coating with a content of preferably between 0.1 and less than 5% by weight, based on the weight of the magnetite coating. They do not form mixed oxides with the iron component since their content is far too small. Instead, they are present as the aluminum oxide and/or oxide hydrate per se, e.g. as $Al_2O_3$ or AlOOH, in the magnetite coating.

Besides the fact that the following dielectric layer may be coated onto the magnetite layer much easier in the case that the magnetite layer is doped with an Al-component, the gloss of the resulting pigments may still be improved therewith.

Thus, the embodiment of the present invention where the magnetite layer is doped with an aluminum compound as disclosed above is preferred. Most preferred is the embodiment of the present invention where the substrate material of the brilliant black pigment is an aluminum dioxide flake as defined above, having no pre-coating but a single layered structure directly onto the substrate and encapsulating the substrate, whereby the layered structure is composed of a first hematite layer and a second magnetite layer doped with an Al-component as defined above, followed by at least one colourless dielectric layer on top of the magnetite layer.

Nevertheless, in order to adapt the colouristic properties of the pigments of the present invention and/or in order to improve the surface characteristics of the substrate particles and/or in order to improve the application properties of the pigments in different media, there may be further coatings or layers, respectively, employed.

To this end, the aluminum dioxide flakes as defined above may be pre-coated with at least one dielectric coating prior to coating the substrate particles with the layered structure consisting of the hematite layer and the magnetite layer.

Such a pre-coating may, inter alia, be applied in order to improve the surface characteristics of the substrate particles, in order to adapt the thickness of the substrate particles to a desired degree or in order to facilitate the coating process for coating the layered structure according to the present invention mentioned above. The adaption of the interference colour of the brilliant black pigments of the present invention is, on the other hand, not the main intention of such a pre-coating, since the magnetite layer within the layered structure will provide the obtained pigment with a black body colour and a bluish interference colour itself and will, in addition, absorb most of the incoming light, i.e. at least 70% thereof. Therefore, the thickness of the pre-coating, if present at all, will be moderate, preferably in a range of from 0.1 to 50 nm, depending on the materials used for the pre-coating.

As materials for the pre-coating, dielectric materials are used, in particular dielectric materials which are commonly used in the production of interference pigments. Those materials may be of high ($\geq 1.8$) or low ($<1.8$) refractive index and may include oxides and/or oxide hydrates of titanium, iron, chromium, zinc, zirconium, tin or silicon, alone or in mixtures thereof.

In the case that such a dielectric pre-coating is applied to the substrate, said dielectric pre-coating is located between the substrate and the first layer (hematite layer) of the layered structure described above.

Of course, the pre-coating may be multilayered as such, but a complicated layer structure like this is costly and not effective in the economical sense.

Preferably, no pre-coating prior to the application of the layered structure consisting of the hematite layer and the magnetite layer is present. Therefore, preferred are brilliant black pigments of the present invention, wherein the layered structure consisting of the hematite layer and the magnetite layer as defined above is directly located on the substrate, and in particular, is wholly encapsulating the substrate.

In contrast to pre-coatings, at least one dielectric layer on top of the hematite/magnetite layered structure is preferably present in the pigments according to the present invention. In this case, the dielectric layer is located directly on top of the magnetite layer.

As material for these dielectric layers, dielectric metal oxide or metal oxide hydrates are generally used in the present invention. Although they might also be coloured under certain circumstances, the dielectric layers are advantageously colourless dielectric layers and composed of colourless metal oxides or metal oxide hydrates or of their mixtures, e.g. of oxides or hydrates of Sn, Ce, Si, Zr and Al, such as tin oxide, cerium oxide, silicon dioxide, zirconium dioxide and aluminum dioxide, or the hydrates thereof.

The thickness of these dielectric layers which are employed in addition to the layered structure of hematite/magnetite depends on the purpose they are used for.

In case the interference colour of the novel brilliant black pigments has to be adapted, the thickness of the dielectric layer on top of the magnetite layer is advantageously adjusted between 20 and 100 nm. In particular a silicon oxide hydrate layer is very useful for diminishing the bluish interference colour generated by the underlying pigment (magnetite layer in combination with substrate and, optionally, underlying pre-coating).

Therefore, in a preferred embodiment of the present invention, there is at least one colourless dielectric layer on top of the magnetite layer. Preferably, this dielectric layer is composed of a colourless, low refractive index dielectric material. Most preferred is a single dielectric layer of silicon oxide hydrate that is located directly on top of the magnetite layer.

Silicon oxide hydrate is a dielectric material with a dense amorphous structure and is, therefore, very useful in order to protect the underlying magnetite layer as well as to diminish, if the desired layer thickness is adjusted due to the skilled person's knowledge, the weak bluish interference colour of the magnetite layer. To this end, the silicon oxide hydrate layer must possess a certain thickness, which is far thicker than the thickness of usual aftercoatings, the latter may, inter alia, be composed of silicon dioxide or its hydrate too.

Nevertheless, the silicon oxide hydrate layer may also be used as a pure protective layer (aftercoating). Thus, the thickness of the silicon oxide hydrate layer located on top of the magnetite layer in the pigments according to the present invention is in the range of from 5 to 100 nm, in particular of from 5 to 50 nm and most preferred of from 5 to 30 nm.

In the case that the silicon oxide hydrate layer located on top of the magnetite layer of the present pigments acts as an interference layer rather than an aftercoating, the layer thickness thereof is advantageously adjusted in a manner to diminish rather than to intensify the interference colour of the underlying pigments. The resulting pigments exhibit a deep black body colour, a weak or very weak bluish interference colour as well as an excellent lustre.

Furthermore, the brilliant black pigments according to the present invention might in addition be adapted to their application requirements by further application of a so called aftercoating, different from the silicon oxide hydrate layer or in addition thereto. In this case, dielectric layers may be used as well. They are known to impart better dispersebility, light fastness, etc., to effect pigments of different kinds and are well known in the art. So called aftercoatings based on inorganic dielectric compounds possess a thickness which is generally smaller than 20 nm and in particular between 1 and 15 nm, preferably between 2 and 10 nm. Dielectric layers of this type as such will not impart any interference to the whole pigment system. Here, in particular very thin layers of silicon dioxide (here in layered systems with other aftercoatings), aluminum oxide, cerium oxide and/or tin oxide and the like are used, either as single components or in the form of mixtures. To this end, also several very thin dielectric layers of different materials as mentioned above, one on top of the other, are often used.

Of course, the colourless dielectric layer as well as layers for the improvement of the application properties may be used together within one embodiment of the present invention. In particular, the brilliant black pigments as mentioned above, namely the pigments consisting of an aluminum dioxide flake having a layered hematite/goethite-magnetite structure and a silicon oxide hydrate layer thereon, may be provided additionally with inorganic aftercoatings in order to impart better application properties in the respective application media to them.

In addition to or alternatively to inorganic dielectric layers for aftercoatings as described above, thin coatings of organic materials, e.g. of different organic silanes, organic titanates, organic zirconates, may also be applied to the surface of the pigments of the present invention in order to improve their application abilities in different application media. Such coatings are known in the art of effect pigments and their application is, therefore, within the ordinary skill of the person skilled in the art.

Examples for the so called "after treatment" of effect pigments, either of organic or of inorganic nature, which may be employed in the present invention as described above, may be found in the following documents: EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805; the content thereof shall be enclosed in the present invention by reference.

A further object of the present invention is a process for the production of the brilliant black pigments mentioned above which is reliable, economic, easily controllable and does not involve a reduction step.

Thus, a process is provided comprising the following steps:

(a) dispersing flaky aluminum oxide substrate particles exhibiting an aspect ratio of at least 85, optionally being coated with at least one dielectric coating, in water, (b) adding a water soluble iron (III) compound at a pH of between 2 and 4 and keeping the pH value constant, thereby precipitating a layer composed of hematite and/or goethite onto the surface of the substrate particles, (c) raising the pH to a value of from 5.5 to 7.5 and adding a water soluble iron (II) compound and a water soluble iron (III) compound, and optionally also adding an aqueous solution of an aluminum compound, while keeping the pH value constant, thereby directly precipitating a magnetite layer, which is optionally doped with an aluminum compound, onto the surface of the substrate particles precoated in step (b), (d) optionally washing and filtering the resulting product, and (e) drying at a temperature in the range of from >100° C. to <180° C.

As flaky aluminum oxide substrate particles, preferably synthetically substrates are employed, which are composed of $Al_2O_3$ or of $Al_2O_3$ containing a small content of $TiO_2$ as described above. Both are referred to as aluminum dioxide flakes here.

As already described earlier, these flakes may be produces with a good control of shape, thickness, thickness deviation, smoothness of the surfaces, planar surfaces and particle size distribution. The better these conditions may be met, the better is the quality and reliability of the resulting pigments with respect to their colouristic properties.

For example, the aluminum dioxide flakes mentioned above may be produced by a process described in EP 763 573 A2, which is preferred. These substrate flakes contain a small amount of titanium dioxide, making the following coating procedure with the dielectric coating or with the hematite/magnetite layered structure easier. Furthermore, by variation of the amount of titanium dioxide within the limits given in the a.m. patent application, as well as by variation of the temperature for the final heat-treatment of the desired flaky aluminium oxide, the particle size and the thickness of the particles may be controlled, which data form the basis for the aspect ratio of the particles. As a rule of thumb, higher amounts of titanium oxide and higher temperatures for the final heat treatment lead to bigger particles having higher aspect ratios. But also aluminum oxide in the form of fine platy particles of a hexagonal crystal system, wherein the plane perpendicular to the c axis is grown into a plate, described in JP-A 39362/1992, would be useful as transparent substrate particles for the pigments of the present invention.

The substrate particles as mentioned above may optionally be precoated with at least one dielectric coating as already described above. To this end, the procedures generally known in the art of pearlescent pigments and effect pigments may be employed. In particular, wet chemical coating procedures are preferred, and particularly preferred are wet chemical coating methods using inorganic starting materials, since these processes are easy to handle and to control, leading to encapsulated substrate particles per se.

In general, wet coating methods for coating the substrate particles with dielectric layers, in particular dielectric metal oxide or metal oxide hydrate layers, are performed as follows: The substrate particles are suspended in water, and one or more hydrolysable metal salts are added at a pH value which is appropriate for hydrolysis and is chosen in such a manner that the metal oxides or metal oxide hydrates are precipitated directly onto the platelets without any instances of secondary precipitation. The pH value is kept constant usually by simultaneous metered addition of a base and/or acid. Subsequently, the pigments are separated off, washed and dried and, if desired, calcined, it being possible to optimize the calcination temperature in respect to the particular coating present. In general, the calcination temperatures are between 250 and 1000° C., preferably between 350 and 900° C. If desired and in the case that the pre-coating should be composed of several layers, following the application of individual layers the pigments can be separated off, dried, and, if desired, calcined before being resuspended for the application of further layers by precipitation.

In the process for the production of the pigments according to the present invention, the calcination step does merely apply to the optionally present pre-coating onto the substrate surface and is completely omitted for the layered hematite/magnetite structure as well as for all dielectric layers which are coated onto said hematite/magnetite layered structure. This is due to the fact that the magnetite layer would be destroyed by applying high temperatures as generally used in calcination steps.

For the sake of completeness, the coating of dielectric pre-coatings can also take place in a fluidized-bed reactor by means of gas-phase coating, in which it is possible, for example, to make appropriate use of the techniques proposed in EP 0 045 851 and EP 0 106 235 for preparing pearl lustre pigments. But the wet coating methods as described above are clearly preferred.

Using the wet chemical methods described above, for instance, the coating of the transparent substrate particles with a silicon dioxide layer or a silicon oxide hydrate layer may be accomplished with a procedure as described in the following: A potassium or sodium silicate solution is metered into a suspension of the material that is to be coated and heated to about 50-100° C. The pH value is held constant at about 6-9 by simultaneous addition of a dilute mineral acid, such as HCl, $HNO_3$ or $H_2SO_4$. As soon as the desired layer thickness of $SiO_2$ has been reached, the addition of the silicate solution is terminated. The batch is subsequently stirred for about 0.5 h. Depending on whether silicon dioxide or silicon oxide hydrate should be achieved, the drying and/or calcination of the resulting layer is exhibited at moderate or higher temperatures, preferably of about 120° C. or higher.

Processes for the wet chemical coating of flaky substrate particles for the production of pearlescent pigments are for example described in the following documents: DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602 and DE 32 35 017.

For coating the aluminum dioxide flakes mentioned above, either precoated or not, with a hematite/magnetite layered structure according to the present invention, the following procedure is preferably applied:

The substrate particles are suspended in water. Preferably, the suspension is heated to a temperature of from 75° C. to 85° C. The pH value of the resulting suspension is adjusted to a value of between 2 and 4, and is kept constant. Thereafter, a water soluble iron (III) compound is slowly metered into the suspension while still keeping the pH value constant. After the addition of the soluble iron (III) compound is completed, whereby a thin layer composed of hematite and/or goethite is precipitated onto the surface of the substrate particles, the pH is raised to a value between 5.5 and 7.5 and kept constant, and a water soluble iron (II) compound as well as a further water soluble iron (III) compound is added to the suspension, either one by one or as a mixture, the latter is preferred. In the case that an aluminum compound should be incorporated into the magnetite layer which is preferred, the pH is preferably adjusted to a value between 6.5 and 7.5 and kept constant. Then, an aqueous solution of an aluminum compound is slowly metered into the suspension either prior to, or after, or, preferably, simultaneously with the iron (II) and iron (III) compounds, while keeping the pH value constant. The suspension is preferably kept under stirring for another 0.5 hours while still keeping the pH value constant.

The first and the second water soluble iron (III) compounds may either be the same or different compounds. Preferably, the same water soluble compound is used for the first as well as for the second addition of an iron (III) compound. The amount for the addition of the first iron (III) compound is chosen in such a manner that merely a very thin hematite layer may be precipitated onto the surface of the substrate particles by using this iron (III) compound. The resulting layer thickness is in the range of from some molecular layers to about 5 nm, as described above. To the contrary, the amounts for the iron (II) compound as well as for the second iron (III) compound, which is added together with the iron (II) compound, are chosen in such a manner that the ratio between iron (II) ions and iron (III) ions is between 9:1 and 9.7:0.3, so that magnetite may be precipitated directly onto the surface of the pre-coated substrate particles. Although there is a larger excess of the iron (II) compound in advance, it has to be mentioned that the iron (II) compound is partly converted into iron (III) oxide due to the process conditions, resulting in direct precipitation of magnetite.

Additionally, the amounts of the iron (II) compound and iron (III) compound used for generating the magnetite layer are chosen in such a manner that the layer thickness of the resulting magnetite layer is larger than that of the hematite layer. Preferably, the amounts are chosen so that the resulting layer thickness of the magnetite layer is at least 10 fold the layer thickness of the hematite layer. Since the density of the hematite layer is very similar to the density of the magnetite layer (5.24 $g/cm^3$ vs. 5.17 $g/cm^3$), the rule of thumb applies that about approximately $5 \times 10^{-3}$ g of hematite or magnetite is needed in order to coat a layer thickness of about 1 nm of either material onto 1 $m^2$ of the respective substrate.

In general, the following water soluble iron compounds may be used: $FeSO_4$, $FeCl_2$, $Fe(NH2)_2(SO_4)_2$, $Fe(NO_3)_2$, $Fe_2(SO_4)_3$, $FeCl_3$, $FeNH_4(SO_4)_2$ or $Fe(NO_3)_3$; $FeSO_4$ and $Fe(NO_3)_3$ being particularly preferred.

In more detail, as water soluble iron (II) compound, preferably $FeSO_4*7H_2O$ may be used. As water soluble iron (III) compound, $Fe(NO_3)_3*9H_2O$ is preferably used.

As already mentioned earlier, it is of great advantage for the magnetic pigments of the present invention that an aluminum compound is included as a doping material in the magnetite layer. Such an Al-doping improves the facility to overcoat the magnetite layer with further dielectric layers as mentioned above and enhances, in addition, stability and denseness of the magnetite layer. Useful Al compounds are water soluble Al salts such as $AlCl_3$ and $Al_2(SO_4)_3$, in particular $Al_2(SO_4)_3 \cdot 16H_2O$ or poly aluminum chloride solution (PAC). This compound may be simply mixed with the iron (II) and iron (III) compounds mentioned above in an appropriate ratio, and then slowly applied to the suspension of the substrate particles already been pre-coated with at least the hematite layer. The conditions for the addition of the Al-compound are described above.

After the precipitation of the magnetite layer is completed, the resulting pigment is separated off, optionally washed, and dried. Drying takes place at a temperature in the range of from larger than 100° C. to lower than 180° C., in particular of from 110° C. to 140° C. The time period for the drying step is between 0.5 and 12 hours.

Optionally, the resulting pigments may then be classified in order to further limit the particle size distribution thereof.

Preferably, the process described above is executed in an inert gas atmosphere, for example using nitrogen, argon or the like.

It is crucial to the colouristic characteristics of the resulting pigment, that, after the hematite/magnetite layered structure has been coated onto the optionally pre-coated substrate particles, no calcination step at temperatures higher than 200° C. takes place.

The pigments according to the present invention, which are achieved by the process as described above, exhibit a lustreous black body colour and a weak or very weak bluish interference colour. In case that a colourless dielectric layer, preferably a low refractive index layer, especially one which is composed of silicon oxide hydrate, is located on top of the magnetite layer, the weak bluish interference colour may be diminished even more.

Therefore, in a further embodiment of the present invention, the brilliant black pigments contain at least one further dielectric layer on top of the hematite/magnetite layered structure, i.e. on top of the magnetite layer, the dielectric layer(s) being able to diminish the interference colour of the underlying pigment.

To this end, at least one further dielectric layer is coated onto the magnetite layer once the hematite/magnetite layered structure has been applied onto the substrate particles. Coating of these additional dielectric layer(s) may, preferably, be accomplished prior to the drying step mentioned above, although an intermediate drying step is also possible. Optionally, a washing and/or filtering step may be executed after coating each dielectric layer onto the pre-coated substrate particles.

The material for the dielectric layer is preferably chosen of dielectric metal oxides and/or metal oxide hydrates. Preferably, in case there is merely one single dielectric layer (being capable to produce or to suppress interference colours by its own) applied onto the magnetite layer, the single dielectric layer is preferably composed of a colourless, low refractive index dielectric material. Most preferred is the application of a single dielectric layer of silicon oxide hydrate that is located directly on top of the magnetite layer.

Depending on the thickness of the low refractive index dielectric layer on top of the magnetite layer, the interference colour generated by the underlying pigment is diminished. The resulting pigments exhibit a deep black body colour, a merely slight bluish interference colour, a high hiding power as well as strong lustre. No angle dependent interference colours (colour flop) may be observed.

Details for the application of the dielectric layer, in particular for the application of a colourless low refractive index dielectric layer of silicon oxide hydrate, have been described earlier.

Next, further dielectric layers may be applied on top of the first dielectric layer which serve as protecting layers regarding the application media of the pigments and are so called aftercoating layers, not being capable to impart or to diminish interference colours to the resulting pigments. These inorganic dielectric layers as well as organic protecting layers, which may also be applied thereon, have been described earlier to some extent.

The brilliant black pigments of the present invention having the characteristics mentioned above, lend themselves to the use in application media, which in particular rely on deep black colours and high lustre, especially automotive applications, cosmetic applications or printing media. Of course, they may also be applied in further applications where black pigments are generally useful.

Therefore, one object of the present invention is solved by the use of the brilliant black pigments according to the present invention for pigmenting inks, paints, varnishes, coating compositions, plastics, foils, paper, ceramics, glasses, cosmetic and pharmaceutic formulations, for laser marking and for pigmenting pigment preparations of diverse solvent contents.

Especially preferred is their use in cosmetic formulations, printing inks and automotive paints or automotive coating compositions such as automotive lacquers.

Printing inks may include, depending on the actual particle size of the brilliant black, all kinds of printing inks which are usually used in printing operations, including screen printing inks, gravure printing inks such as intaglio printing inks, offset printing inks, flexographic printing inks as well as ink jet printing inks, to name only a few. Since the brilliant black pigments according to the present invention exhibit small particle sizes, they may advantageously used in almost all common printing processes, including those, which are not useful when large pigments should be used, such as gravure printing processes.

Owing to their excellent lustre and blackness, the pigments of the present invention are particularly useful for cosmetic applications, both in the area of decorative cosmetics and for personal-care products. On use of the pigments according to the present invention with absorption pigments, dyes and/or other effect pigments, particular effects can be achieved with them in various application media, for example in cosmetic formulations for mascaras, eyeliners and kohl eye pencils. In these media, they exhibit better gloss and hiding power at comparable blackness than black mica pigments used so far.

To this end, the brilliant black pigments according to the present invention may be combined in the formulations with cosmetic raw materials and assistants of any type. These include, inter alia, oils, fats, waxes, film formers, preservatives and assistants such as thickeners, rheological additives and/or surface-active assistants.

A further object of the present invention is also solved by a product containing the pigments of the present invention. In general, the pigments of the present invention may be applied to any product which can take advantage of one of the characteristics of the present pigments, i.e. their colouristic or their magnetic properties, which they also exhibit, or both.

In particular, the pigments of the present invention may be used with high advantage in decorative products, in cosmetic formulations, in automotive lacquers or in printing inks, where their outstanding optical characteristics are highly desired.

It goes without saying that the brilliant black pigments according to the present invention may be used in admixture with organic as well as inorganic colourants and pigments and, in particular, with effect pigments of any kind. Organic pigments and colourants are, for example monoazo pigments, disazo pigments, polycyclic pigments, cationic, anionic or nonionic colourants. Inorganic colourants and pigments are, for example white pigments, coloured pigments, further black pigments or effect pigments. Examples for appropriate effect pigments are metal effect pigments, pearlescent pigments or interference pigments, which are in general based on singly or multiply coated platelets of mica, glass, $Al_2O_3$, $Fe_2O_3$, $SiO_2$, etc. Examples for the structure and particular characteristics of these pigments are disclosed, inter alia, in RD 471001 or RD 472005, the disclosure thereof shall be included in the present specification by reference.

In addition, further colourants which may be used in admixture with the present brilliant black pigments are luminescent colourants and/or pigments of any type as well as holographical pigments or LCPs (pigments on the basis of liquid crystal polymers).

The pigments according to the present invention may be used in any desired mixing ratio with commonly used and commercially available pigments and fillers. Limitations for the use of the present pigments with other pigments and colourants are merely set in case that any mixture would disturb or limit the colouristic properties of the pigments according to the present invention to a great extent.

The present invention is described in more detail in the following examples, but should not be limited to these.

EXAMPLE 1

100 g of an aluminum dioxide flake ($Al_2O_3$ with minor content of $TiO_2$, mean thickness 150 nm, $D_{50}$ 14 μm) is suspended in deionized water. The suspension is heated to 80° C. while stirring. Nitrogen gas is slowly added into the reaction vessel. The pH value is adjusted and kept constant to 3.0 by metering an acidic compound into the suspension (HCl, about 17.5 wt. %). While still keeping the pH value constant, a $Fe(NO_3)_3$ solution (100 ml, 5.06 g of $Fe(NO_3)_3*9H_2O$ in 100 ml deionized water) is added to the suspension. The pH value is then raised to about 7.0 by adding a basic composition (NaOH, about 30 wt. %) to the suspension. While keeping the pH value constant, an aqueous solution of an Al component and of a Fe(II) and Fe(III) component (2000 ml, 720.4 g $FeSO_4*7H_2O$, 4.5 g $Al_2(SO_4)_3*16H_2O$ and 45.1 g $Fe(NO_3)_3*9H_2O$, in 2000 ml deionized water) is slowly metered into the suspension which is then kept for another 30 minutes while stirring. Thereafter, a water glass solution (about 38.5 g, 26% as $SiO_2$) is added while still keeping the pH constant. The suspension is kept for about 2 hours, then the resulting pigments are separated off by filtering and washed with deionized water.

Eventually, the resulting pigments are dried at a temperature of about 120° C. and sieved.

The resulting pigment exhibits a brilliant black powder colour with vivid lustre as well as a high hiding power.

The powder colour is measured by using a Minolta CR-300 apparatus (product of Konica Minolta Holdings, Inc.). The resulting L value is 47.03, the a value is 0.9, the b value is −1.02 and chroma is 1.36.

A lacquer card is prepared as follows: 0.5 g of the pigment according to example 1 is mixed with 9.5 g of a standard NC-Acrylate lacquer (available from Merck KGaA per catalogue). The resulting mixture is coated by means of a bar coater (No. 20) onto usual black/white paper strips and dried. The resulting colouristic characteristics are measured by using the Minolta apparatus as mentioned above.

The L value is determined to be 28.41, the a value is 0.59, the b value is −1.06 and chroma is determined to be 1.21.

EXAMPLE 2

The procedure of example 1 is repeated except that no silicon oxide hydrate layer is applied onto the magnetite layer.

The corresponding amounts used for examples 1 and 2 may be taken from table 1.

TABLE 1

| Sample | substrate g | $Fe_2O_3$ g | $Fe_3O_4$ g | $SiO_2$ g |
|---|---|---|---|---|
| Ex. 1 | 100 | 1 | 155 | 10 |
| Ex 2 | 100 | 1 | 155 | 0 |

The colouristic values of the pigments according to examples 1 and 2 measured by the Minolta 300 apparatus are listed in table 2 beneath. In addition, a commercially available black mica pigment [mica coated with $TiO_2$ and $Fe_3O_4$ (Iriodin® 600, Product of Merck KGaA)] is also measured for comparison.

TABLE 2

| | Powder colour | | | | colour of lacquer card | | | |
|---|---|---|---|---|---|---|---|---|
| Sample | L | a | b | C | L | a | b | C |
| Ex. 1 | 47.03 | 0.90 | −1.02 | 1.36 | 28.41 | 0.59 | −1.06 | 1.21 |
| Ex. 2 | 48.85 | 2.80 | −3.45 | 4.44 | 28.02 | 2.22 | −3.75 | 4.36 |
| Mica black | 39.45 | 0.10 | −0.45 | 0.46 | 23.60 | 0.28 | −1.28 | 1.31 |

Regarding blackness (C-value), the pigments according to the present invention are comparable to mica black, but exhibit a somewhat bluish interference colour, demonstrated by the a- and b-values. This interference colour is substantially diminished by the silicon oxide hydrate layer applied onto the magnetite layer in example 1. Since the L-value, measured by the Minolta 300 apparatus, refers to lightness rather than to lustre, further draw down lacquer cards are prepared as mentioned above and the lustre of each sample is evaluated in the Hunter Lab-system by using a Model D25 Optical Sensor, made by Hunter Associates laboratory, Inc.

The resulting Hunter-Lab-values are listed in the following table 3, whereby L refers to lustre and the a- and b-values are also measured at the lustre angle:

TABLE 3

| | Lacquer card (Hunter) | | | |
|---|---|---|---|---|
| Sample | L | a | b | C |
| Ex. 1 | 34.95 | 0.29 | −2.02 | 2.04 |
| Ex 2 | 35.14 | 1.78 | −4.34 | 4.69 |
| Mica black | 28.96 | 0.55 | −1.74 | 1.82 |

As can be seen in table 3, the lustre values for the pigments according to examples 1 and 2 of the present invention are much better than that for mica black. While the a-, b- and c-values of example 1 and of mica black are comparable, example 2 exhibits a somewhat bluish interference colour. Despite this slight interference, the compelling lustre is so impressive that pigments according of examples 1 and 2 are of high interest, in particular for cosmetic applications.

Furthermore, for different applications, including cosmetic, automotive and printing applications, the hiding power of the pigments is of great interest, since it, inter alia, determines the necessary concentration of pigments for obtaining deep black colouristic results in application media.

The hiding power of the present pigments may be evaluated by calculating the difference of the lightness L between the white and black part of the draw down cards. The higher the hiding power, the smaller the L-difference between white and black part of the draw down card, measured by Minolta CR-300. The results are listed in table 4 below:

TABLE 4

| Sample | L value (Minolta 300) | | |
| --- | --- | --- | --- |
| | White card | Black card | Difference |
| Ex. 1 | 30.53 | 28.41 | 2.12 |
| Ex 2 | 30.18 | 28.02 | 2.16 |
| Mica black | 27.08 | 23.60 | 3.48 |

As can be seen in table 4, the hiding power of the pigments according to examples 1 and 2 is higher than that of mica black.

COMPARATIVE EXAMPLES 2, 3 AND 4

For further comparison, comparative examples 2 to 4 are carried out, using different substrate particles. To this end, the procedure of example 1 is repeated except that the coating amount for the $Fe_3O_4$ layer is adjusted to achieve at a dark bluish interference colour and, in addition, the presence of an outer silicon oxide hydrate layer is varied.

Details are listed in the following table 5:

TABLE 5

| Sample | substrate | amount of substr. g | $Fe_2O_3$ g | $Fe_3O_4$ g | $SiO_2$ g |
| --- | --- | --- | --- | --- | --- |
| Comp. Ex. 2 | $Al_2O_3$-Flake | 100 | 1 | 120 | 0 |
| Comp. Ex. 3 | $Al_2O_3$-Flake | 100 | 1 | 120 | 12.5 |
| Comp. Ex. 4 | Mica | 100 | 1 | 141 | 0 |

$Al_2O_3$-Flakes with average thickness 220 nm, $D_{50}$: 18 μm
Mica-Flakes $D_{50}$: 18 μm The colouristic properties measured by Minolta 300 are as follows:

TABLE 6

| Sample | powder colour | | | | colour of lacquer card | | | |
| --- | --- | --- | --- | --- | --- | --- | --- | --- |
| | L | a | b | C | L | a | b | C |
| Comp. Ex. 2 | 47.86 | 0.09 | −8.10 | 8.10 | 27.69 | −2.15 | −8.17 | 8.45 |
| Comp. Ex. 3 | 47.49 | −0.57 | −3.71 | 3.75 | 28.20 | −0.64 | −6.92 | 6.95 |
| Comp. Ex. 4 | 46.83 | 0.60 | −0.34 | 0.68 | 23.76 | 1.08 | 0.65 | 1.26 |

Regarding the lustre measured using the Hunter-Lab-values as explained above, the following data is determined:

TABLE 7

| Sample | Lacquer card (Hunter) | | | |
| --- | --- | --- | --- | --- |
| | L | a | b | C |
| Comp. Ex. 2 | 35.49 | −1.33 | −8.58 | 8.68 |
| Comp. Ex 3 | 35.79 | −0.31 | −7.01 | 7.02 |
| Comp. Ex. 4 | 30.44 | 0.72 | −0.22 | 0.75 |

In table 8, the hiding power of each of the comparative examples is calculated according to the method mentioned above:

TABLE 8

| Sample | L value (Minolta 300) | | |
| --- | --- | --- | --- |
| | White card | Black card | Difference |
| Comp. Ex. 2 | 30.97 | 27.69 | 3.28 |
| Comp. Ex. 3 | 33.78 | 28.20 | 5.58 |
| Comp. Ex. 4 | 29.46 | 23.76 | 5.70 |

As a result, none of the pigments according to the comparative examples fulfils all requirements for attractive blackness, low interference colour, high lustre and high hiding power, as the pigments of the present invention do.

Pigments based on aluminum dioxide flakes, which do not fulfil the aspect ratio according to the present invention exhibit a higher lustre than mica pigments having the same particle size, but too strong interference colours, regardless on whether additionally coated with a silicon oxide hydrate layer or not. Black mica pigments, on the other side, provide good blackness and low interference colour, but not sufficient lustre. None of the pigments according to the comparative examples exhibits sufficient hiding power when compared with the pigments according to the present invention.

The invention claimed is:

1. Brilliant black pigments, each pigment comprising
   flaky aluminum oxide substrate particles exhibiting an aspect ratio of at least 85, and
   a coating comprising a layered structure consisting of
   a first layer composed of hematite and/or goethite and
   a second layer composed of magnetite, in this sequence, on the substrate,
   wherein the thickness of the layer composed of magnetite is 50 to 250 nm, and
   wherein the substrate particles have a mean particle diameter of lower than 20 μm and a $D_{50}$ value of 10 to 15 μm, measured by the laser diffraction method,
   wherein the pigments are brilliant black pigments.

2. The brilliant black pigments according to claim 1, wherein the substrate particles are of $Al_2O_3$ or of $Al_2O_3$ containing up to 5% by weight $TiO_2$.

3. The brilliant black pigments according to claim 1, wherein the substrate particles have a mean thickness between 50 and 200 nm.

4. The brilliant black pigments according to claim 1, wherein the substrate particles have a mean particle diameter of 5 and 15 μm μm.

5. The brilliant black pigments according to claim 1, wherein the mean particle diameter is lower than 16 μm.

6. The brilliant black pigments according to claim 1, wherein the thickness of the layer composed of magnetite is higher than the thickness of the layer composed of hematite and/or goethite.

7. The brilliant black pigments according to claim 1, wherein the layer composed of hematite and/or goethite is located directly on the substrate.

8. The brilliant black pigments according to claim 1, wherein there is at least one dielectric coating located between the substrate and the layer composed of hematite and/or goethite.

9. The brilliant black pigments according to claim 1, comprising furthermore a colourless dielectric layer on top of the magnetite layer.

10. The brilliant black pigments according to claim 9, wherein the colourless dielectric layer is a silicon oxide hydrate layer which is located directly on top of the magnetite layer.

11. The brilliant black pigments according to claim 1, wherein the magnetite layer is doped with an aluminum compound.

12. The brilliant black pigments according to claim 11, wherein the aluminum compound is an oxide and/or an oxide hydrate.

13. The brilliant black pigments according to claim 11, wherein the content of the aluminum compound is between 0.1 and less than 5% by weight, based on the weight of the magnetite layer.

14. The brilliant black pigments according to claim 9, exhibiting a deep black body colour and, optionally, a blue interference colour.

15. A product selected from the group consisting of pigmenting inks, paints, varnishes, coating compositions, plastics, foils, paper, ceramics, glasses, cosmetic formulations, pharmaceutic formulations, laser marking and pigment preparations of diverse solvent contents, comprising pigments according to claim 1.

16. The product according to claim 15, wherein the ink is a printing ink.

17. The product according to claim 15, wherein the paint or coating composition is an automotive paint or automotive coating composition.

18. The product according to claim 15, wherein the cosmetic formulation is a mascara formulation, an eyeliner formulation or a kohl eye pencil formulation.

19. A product, comprising a pigment according to claim 1.

20. A process for preparing the pigments according to claim 1, comprising the following steps:
(a) dispersing flaky aluminum oxide substrate particles exhibiting an aspect ratio of at least 85, optionally being coated with at least one dielectric coating, in water,
(b) adding a water soluble iron (III) compound at a pH of between 2 and 4 and keeping the pH value constant, thereby precipitating a layer composed of hematite and/or goethite onto the surface of the substrate particles,
(c) raising the pH to a value between 5.5 and 7.5 and adding a water soluble iron (II) compound and a water soluble iron (III) compound, and optionally also adding an aqueous solution of an aluminum compound, while keeping the pH value constant, thereby directly precipitating a magnetite layer, which is optionally doped with an aluminum compound, onto the surface of the substrate particles precoated in step (b),
(d) optionally washing and filtering the resulting product and
(e) drying at a temperature in the range of from >100° C. to <180° C.

21. The process according to claim 20 which is executed in an inert gas atmosphere.

22. The process according to claim 20, wherein after performing step (c) and prior to performing step (e), in an additional step at least one colourless dielectric layer is coated onto the magnetite layer.

23. The process according to claim 22, wherein the dielectric layer coated onto the magnetite layer is a silicon oxide hydrate layer.

24. The process according to claim 20, wherein the layer composed of magnetite is applied onto the substrate particles at a higher thickness than the layer composed of hematite and/or goethite.

* * * * *